United States Patent
Parnell et al.

(10) Patent No.: US 9,772,894 B2
(45) Date of Patent: Sep. 26, 2017

(54) SYSTEMS, METHODS, AND MACHINE-READABLE MEDIA TO PERFORM STATE DATA COLLECTION

(71) Applicant: NetApp, Inc., Sunnyvale, CA (US)

(72) Inventors: Joseph Parnell, Wichita, KS (US); Del Ojar Peters, Wichita, KS (US); Kenneth Leo Gitchell, Wichita, KS (US)

(73) Assignee: NetApp, Inc., Sunnyvale, CA (US)

( * ) Notice: Subject to any disclaimer, the term of this patent is extended or adjusted under 35 U.S.C. 154(b) by 58 days.

(21) Appl. No.: 15/010,813

(22) Filed: Jan. 29, 2016

(65) Prior Publication Data

US 2017/0220406 A1    Aug. 3, 2017

(51) Int. Cl.
*G06F 11/00* (2006.01)
*G06F 11/07* (2006.01)

(52) U.S. Cl.
CPC ........ *G06F 11/0778* (2013.01); *G06F 11/079* (2013.01); *G06F 11/0727* (2013.01); *G06F 11/0751* (2013.01)

(58) Field of Classification Search
CPC ............ G06F 11/0778; G06F 11/0727; G06F 11/0751; G06F 11/079; G06F 11/1435; G06F 11/3648; G06F 11/1402; G06F 11/0793; G06F 2201/88; G06F 2201/885; G06F 2201/87
See application file for complete search history.

(56) References Cited

U.S. PATENT DOCUMENTS

| | | | | |
|---|---|---|---|---|
| 6,701,471 B2 * | 3/2004 | Tamura | ............... | G06F 11/1008 365/200 |
| 6,845,470 B2 * | 1/2005 | Austen | ............... | G06F 11/0712 714/10 |
| 7,027,256 B1 * | 4/2006 | Subrahmanyam | . | G11B 5/59627 360/77.04 |
| 7,721,165 B2 * | 5/2010 | Tamura | ............... | G06F 11/1008 714/718 |
| 9,251,339 B2 * | 2/2016 | Bullis | ..................... | G06F 21/50 |
| 9,448,731 B2 * | 9/2016 | Nallathambi | ......... | G06F 3/0619 |
| 2003/0163758 A1 * | 8/2003 | Austen | ............... | G06F 11/0712 714/38.1 |
| 2004/0088640 A1 * | 5/2004 | Lin | ................... | G11B 20/00086 714/776 |
| 2009/0327809 A1 * | 12/2009 | Joy | ...................... | G06F 11/3636 714/26 |
| 2011/0078537 A1 * | 3/2011 | Gruner | ............... | G06F 11/1008 714/758 |
| 2016/0139836 A1 * | 5/2016 | Nallathambi | ......... | G06F 3/0619 711/114 |
| 2016/0142483 A1 * | 5/2016 | Nallathambi | ....... | H04L 67/1097 707/639 |

\* cited by examiner

*Primary Examiner* — Nadeem Iqbal
(74) *Attorney, Agent, or Firm* — Haynes and Boone, LLP; Thomas Kelton; R. Whitman Burns

(57) ABSTRACT

A method, computing device, and system for performing a core dump is provided that aggregates core dump data from storage controller components. In some embodiments, the method includes detecting corrupted data corresponding to a data sector included in a storage volume. After detecting the corrupted data, the storage volume is quiesced. Data is collected from a controller processor, I/O controller, controller cache, storage volume, interrupted write recovery portion, trace log, and backup device.

20 Claims, 4 Drawing Sheets

SYSTEMS, METHODS, AND MACHINE-READABLE MEDIA TO PERFORM STATE DATA COLLECTION

TECHNICAL FIELD

The present description relates generally to data processing error handling, and more specifically, to systems, methods, and machine-readable media for performing data collection responsive to error detection.

BACKGROUND

A core dump is performed to record portions of memory to a persisted state. Generally, a core dump is performed in response to a detected error, such that the recorded portions of the memory may be analyzed to diagnose and debug the error. Traditionally, the recorded portions of memory have been restricted to processor memory, registers, and some log data.

The recorded portions of memory from a core dump are conventionally persisted to the same storage array in which the core dump was performed. The core dump may then be offloaded from the storage array to another server for analysis and debugging.

A traditional core dump does not capture all information corresponding to the system state of the storage array. Accordingly, the storage array may be maintained in a relatively unmodified state, such that system information may be accessed as needed. Isolating a root cause of an error by analyzing data included in a core dump may be time-consuming and difficult. Thus, the storage array may be removed from service for a long period of time to avoid risking loss to the system state information that is not recorded in the core dump. In other instances, the storage array may be returned to operation, which may result in losing valuable system state information that would have been helpful for debugging the cause of the error and/or recovering lost data.

Accordingly, a technique for allowing analysis and debugging of core dump data to be performed without significantly reducing performance of the storage array or risking loss of the system state of the storage array would provide numerous advantages to both storage array performance and error diagnosis/recovery. Thus, while existing core dump techniques have been generally adequate for diagnosis of fatal programming errors, limitations remain.

BRIEF DESCRIPTION OF THE DRAWINGS

The present disclosure is best understood from the following detailed description when read with the accompanying figures.

DETAILED DESCRIPTION

Figure 1:
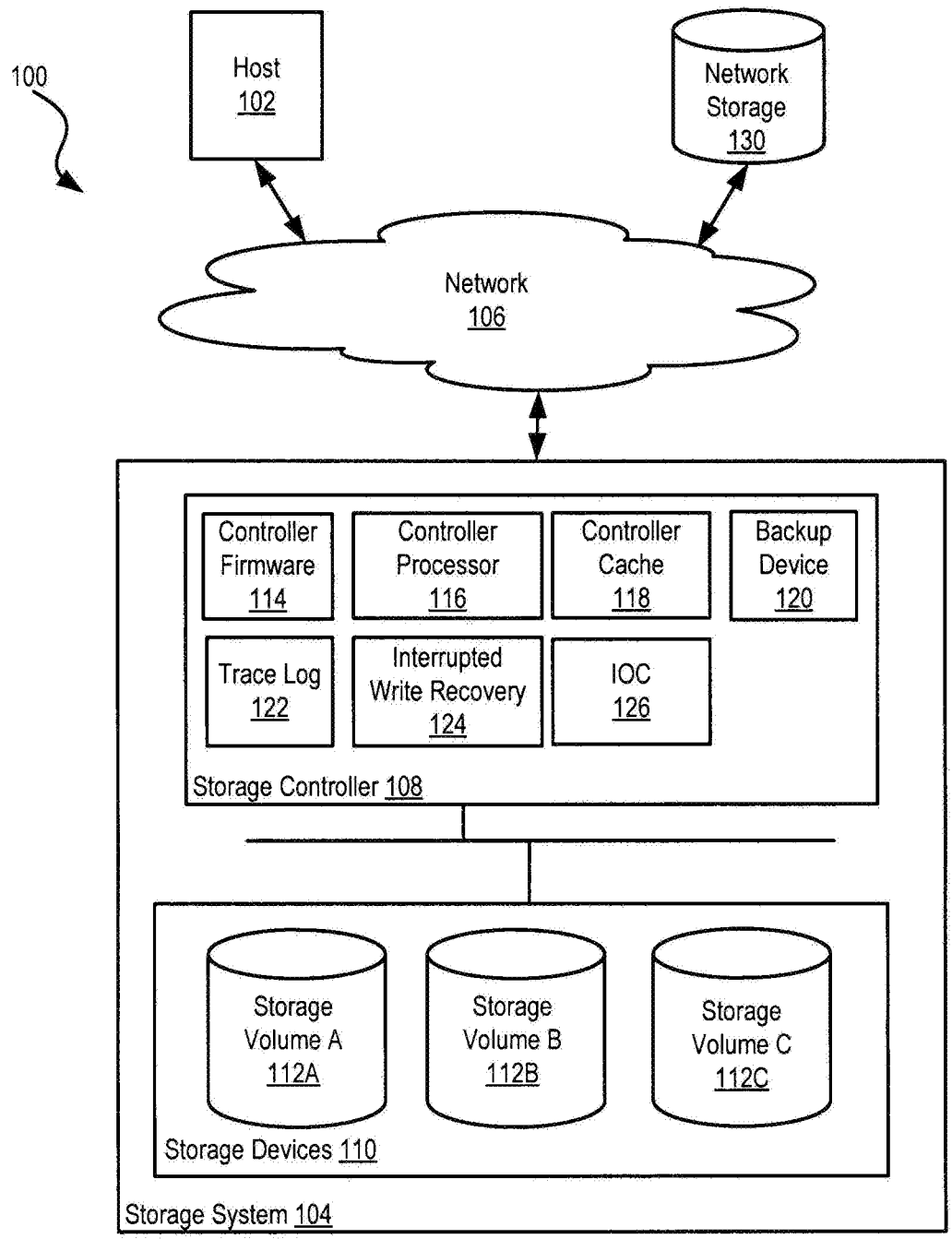
FIG. 1 is an organizational diagram of a data storage architecture according to aspects of the present disclosure.

All examples and illustrative references are non-limiting and should not be used to limit the claims to specific implementations and embodiments described herein and their equivalents. For simplicity, reference numbers may be repeated between various examples. This repetition is for clarity only and does not dictate a relationship between the respective embodiments. Finally, in view of this disclosure, particular features described in relation to one aspect or embodiment may be applied to other disclosed aspects or embodiments of the disclosure, even though not specifically shown in the drawings or described in the text.

Various embodiments include systems, methods, and machine-readable media for collecting data for a core dump and offloading the core dump to another computing device for debugging and analysis. In an example embodiment, a storage controller or host detects that there is a data error, such as corrupted data.

Based on the detecting of the data error, the storage controller performs a core dump. The core dump includes aggregating, by the storage controller, data from various locations of a storage system and persisting the aggregated data to one or more core dump files. The data includes system state information, such that the system state may be preserved for later analysis and debugging. For example, the storage controller may retrieve the data from locations such as controller processor memory, Input/Output Controller (IOC) memory, storage volumes of the storage system, and controller cache memory included on the storage controller. It will be recognized that aggregating the data from the controller cache and storage volumes, in addition to the controller processor and IOC memory, may provide additional information that may be used for analysis and debugging to assist in error diagnosis.

The one or more core dump files may be compressed to preserve storage space and/or improve data transfer times. In addition, the core dump data may be streamed in a compressed data stream to a remote network storage device for analysis and debugging by another computing device. It will be recognized that offloading the one or more core dump files to another computing device for analysis and debugging may allow the storage controller to resume normal operation following a core dump without risking losing the system state that is preserved in the one or more core dump files.

A data storage architecture 100, in which various embodiments may be implemented, is described with reference to FIG. 1. The storage architecture 100 includes a host 102 that is structured as a computing device, such as a rack mount server, desktop computer, laptop computer, handheld/mobile computing device, or other computing device. In other examples, there may be additional hosts. The host 102 is structured to communicate I/O requests to a storage system 104 to perform data transactions at the storage system 104. In some examples data transactions include reading data, writing data, querying data, executing operations corresponding to the data, and so forth. For example, the host 102 may request that data be written to and/or retrieved from the storage system 104.

The host 102 is communicatively coupled to a storage system 104 via a network 106. The network 106 may include one or more sub-networks. The network 106 may include any combination of public and/or private networks. The network 106 may include one or more network devices and transport media that are communicatively coupled via transport media. For example, network devices may include routers, hubs, switches, and so forth. Transport media may include, for example, Ethernet cable, Fibre Channel Cable, wireless signals, and so forth.

In the present example, the host 102 is structured to detect I/O errors, such as data integrity errors corresponding to corrupted data that is communicated to and/or from the storage system 104. In some examples, the host 102 is structured to detect the corrupted data using checksums, parity checking, and/or other error detection means. In some examples, the host 102 is structured to notify the storage system 104 regarding errors that are detected, by sending messages to the storage system 104 via the network 106. The messages may include information such as a type of error detected and the location(s) corresponding to the detected error. The location corresponding to the error may be indicated by the host 102 providing identification information of one or more storage volumes, storage stripes, and/or data sectors where the corrupted data is detected.

The storage system 104 is structured as a computing device, such as a rack mount server, desktop computer, laptop computer, or other computing device. The storage system 104 may also include a single computing device or multiple computing devices that are communicatively coupled, such as via the network 106.

The storage system 104 is structured to receive I/O requests and/or error messages from the host 102 via the network 106 and to perform operations responsive to the I/O requests and/or error messages. The operations performed by the storage system 104 may be to process data transactions on behalf of the host 102. The storage system 104 may perform tasks to process data transactions (e.g., requests to read and/or write data) from the host 102 or other hosts, and take actions such as reading, writing, or otherwise accessing the requested data. In some examples, the storage system 104 returns a response to the host 102 that includes requested data and/or a status indictor corresponding to a transaction.

It is understood that for clarity and ease of explanation, a single host 102 and a single storage system 104 are illustrated in the present example, although in other examples any number of hosts may be in communication with any number of storage systems.

The storage system 104 includes a storage controller 108 and storage devices 110. In the present example, the storage controller 108 exercises low-level control over the storage devices 110 in order to execute instructions to perform the data transactions of the storage system 104.

In some examples, the storage system 104 includes a plurality of storage controllers. Having at least two storage controllers may be useful, for example, for failover and load balancing purposes in the event of equipment failure of either storage controller. Additional storage controllers may be structured to include similar components to those described with respect to storage controller 108.

The storage controller 108 is structured to include controller firmware 114. The controller firmware 114 includes one or more computer-readable storage media that store instructions that may be executed by the controller processor 116. In the present example, the controller firmware 114 includes instructions that may be executed by the controller processor 116 to detect corrupted data, perform core dump techniques, and communicate I/O with the host 102, storage devices 110, and network storage 130. Examples of core dump techniques that may be implemented by the instructions stored in the controller firmware 114 when executed by the controller processor 116 are discussed further with respect to FIGS. 2 and 3.

The controller processor 116 is structured with one or more processors that are coupled to one or more volatile processor memory devices. The processor(s) are structured to execute instructions to perform I/O operations. For example, instructions may be loaded into a volatile controller processor memory from the controller firmware 114 and executed from the volatile controller processor memory by the processor(s). For example, the volatile controller processor memory may include one or more registers, which data may be loaded into for execution by the processor(s). Examples of processors include microcontrollers or central processing units (CPUs) that are operable to execute computing instructions.

The instructions, when executed by the controller processor 116, cause the controller processor 116 to perform various operations described herein with respect to the storage controller 108 of the storage system 104 in the examples included in the present disclosure. Instructions may also be referred to as code. The terms "instructions" and "code" should be interpreted broadly to include any type of computer-readable statement(s). For example, the terms "instructions" and "code" may refer to one or more software applications, programs, routines, sub-routines, functions, procedures, etc. "Instructions" and "code" may include a single computer-readable statement or many computer-readable statements.

The controller cache 118 includes memory that is structured to store data to be written to or read from the storage devices 110. For example, the data in the controller cache 118 may correspond to particular data sectors, storage stripes, and/or volumes that are configured in the storage devices 110. The storage controller 108 may include one or more mapping structures that map data from the controller cache 118 to the corresponding data sectors, storage stripes, and/or volumes of the storage devices 110. In some examples, the mapping structure(s) are stored in the controller cache 118.

In some examples, data corresponding to the storage devices 110 is temporarily stored in the controller cache 118 to allow faster access to the data by the host 102 and/or storage system 104 than would be provided by accessing the data from the storage devices 110. The controller cache 118 may provide faster access to the data than the storage devices 110 by including faster memory and/or by including other mechanisms that expedite transaction processing. The controller cache 118 may include any volatile or non-volatile storage medium, but common examples of controller cache 118 memory may include resistive RAM (RRAM), phase-change RAM (PCRAM), flash memory (e.g., NAND/NOR flash memory), battery-backed DRAM, and so forth.

The storage controller 108 is structured to write data from the controller cache 118 to the storage devices 110 and remove the data from the controller cache 118. The writing of the data from the controller cache 118 to the storage devices 110 and removing of the data from the controller cache 118 may be referred to as controller cache flushing. In some examples, the storage controller 108 is structured to flush data from the controller cache 118 to the storage devices 110 based on pre-defined triggers, such as when an amount of data in the controller cache 118 exceeds a threshold. In some examples, data is flushed from the controller cache 118 without removing the data from the controller cache 118, such that the data may be read from the controller cache 118 by the storage controller 108.

In some examples, the controller cache 118 is partitioned to include a shared read-only cache region. For example, the shared read-only cache region may be partitioned to include read data only, such that the data in the shared read-only cache region may be overwritten at any time without concern for a loss of data. Accordingly, the shared read-only cache region may be used to store core dump data during a core dump process. The shared read-only cache region may be structured to include volatile memory, such that power loss may result in losing data from the shared read-only cache. Accordingly, data may be backed up to a backup device 120 from the shared read-only cache so that data from the shared read-only cache may be recovered from the backup device 120.

The storage controller 108 is structured to include the backup device 120. The backup device 120 is structured as a non-volatile attached storage device that, in the event of a power loss, may be used to persist data from the controller cache 118 that has not been flushed to the storage devices 110. For example, the data may be persisted during a low-power boot sequence that utilizes battery-backed memory, such as DRAM. In some examples, the storage controller 108 is structured to temporarily store controller cache 118 data in the shared read-only region of the controller cache 118 prior to copying the data to the backup device 120. The copy of the data on the backup device 120 may provide redundancy that may protect the storage system 104 from power loss or other storage controller 108 failure.

The storage controller 108 is structured to include a trace log 122 that includes one or more I/O log entries that contain I/O trace data. The trace log 122 may be included in the controller cache 118 or on a cache memory that is separate from the controller cache 118. In the present example, the I/O trace data included in the trace log 122 contains information about storage controller 108 components, devices, structures, and so forth. For example, the information may include timestamps corresponding to operations performed, I/O identifiers, LBA references. I/O data, and so forth.

The storage controller 108 is structured to include an interrupted write recovery (IWR) 124 portion, which may be included in a non-volatile memory such as non-volatile static random access memory (NVSRAM) and/or non-volatile random access memory (NVRAM). In some examples, the IWR 124 portion is included in a reserved storage space of the storage controller 108. The IWR 124 portion may include data corresponding to write operations that are interrupted from processing, by a re-boot of the storage controller 108.

The storage controller 108 is structured with an I/O controller (IOC) 126. The IOC includes one or more processors that control I/O to external devices, such as the storage devices 110. For example, the IOC 126 may process I/O to be sent to and/or received from the storage devices 110. The IOC 126 may include one or more volatile memory devices that are structured to store I/O data that is processed by the one or more processors of the IOC controller 126. For example, the one or more volatile memory devices may include one or more registers, which data may be loaded into for execution by the one or more processors.

Storage devices 110 may be structured to include one or more storage devices that include hard disk drives (HDDs), solid state drives (SSDs), optical drives, and/or any other suitable volatile or non-volatile data storage medium. In some embodiments, the storage devices are relatively homogeneous (e.g., having the same manufacturer, model, and/or configuration). However, in other examples, the storage devices 110 include a heterogeneous set of storage devices, such as storage devices of different media types from different manufacturers with notably different performance.

The storage system 104 may group storage devices 110 for speed and/or redundancy using a virtualization technique such as RAID (Redundant Array of Independent/Inexpensive Disks). At a high level, virtualization includes mapping physical addresses of the storage devices 110 into a virtual address space and presenting the virtual address space to the host 102. In this way, the storage system 104 represents the group of devices as a single device, often referred to as a volume. Thus, a host 102 can access the volume without concern for how it is distributed among the underlying storage devices 110. In the present example, the storage devices 110 include a plurality of volumes (e.g., storage volumes 112A, 112B, and 112C). In other examples, the storage devices 110 may include a single volume or a plurality of volumes.

Each storage volume may include data that may be accessed by storage controllers (e.g., storage controller 108) to perform data transactions on, behalf of hosts (e.g., host 102). The data that is accessed from the storage volumes may be configured in a layout that includes storage stripes that include a plurality of data sectors. For example, a storage controller 108 may be structured to store data on the storage devices 110 using a data protection scheme such as RAID 1 (mirroring), RAID 5 (striping with parity), or RAID 6 (striping with double parity). To do so, data is divided into storage stripes and divided again into data segments and parity segments. Each data segment and parity segment represents the portion of a stripe allocated to a particular storage device 110, and while the data segments and parity segments may have any suitable size (e.g., 64K, 128K, 256K, 512K, etc.), they are typically uniform across storage devices 110. Data segments are again divided into data sectors, which are typically uniform blocks of the data segments that are allocated to store particular data. The parity segment assists in detecting corrupted data in the storage stripe. For example, the parity segment of a storage stripe may include a parity bit that is set to an odd or an even value based on the data sector values in the storage stripe.

In some examples, the storage devices 110 include one or more storage volumes that are structured to store data corresponding to one or more core dump files. These storage volumes may be separate from the storage volumes that store other storage system 104 data. For example, files corresponding to each core dump may be structured in a separate storage volume or the core dump files may be aggregated in one or more storage volumes that are dedicated to storing core dump files.

The storage system 104 may also be communicatively coupled to network storage 130. The network storage 130 includes one or more storage media that are accessible to the storage system 104 via the network 106. In some examples, the storage controller 108 is structured to transmit data corresponding to one or more core dump operations to the network storage 130 via a data stream, which may include core dump files that are structured in a compressed and/or non-compressed format. The network storage 130 may be coupled to a server that is structured to receive the data stream(s) and store the received core dump data in one or more core dump files. The network storage 130 may maintain the one or more core dump files in memory for retrieval by other computing devices, and/or analysis and debugging from the network storage 130. In some examples, the one or more core dump files are assigned to volumes that are configured in the one or more storage media of the network storage 130.

Figure 2:
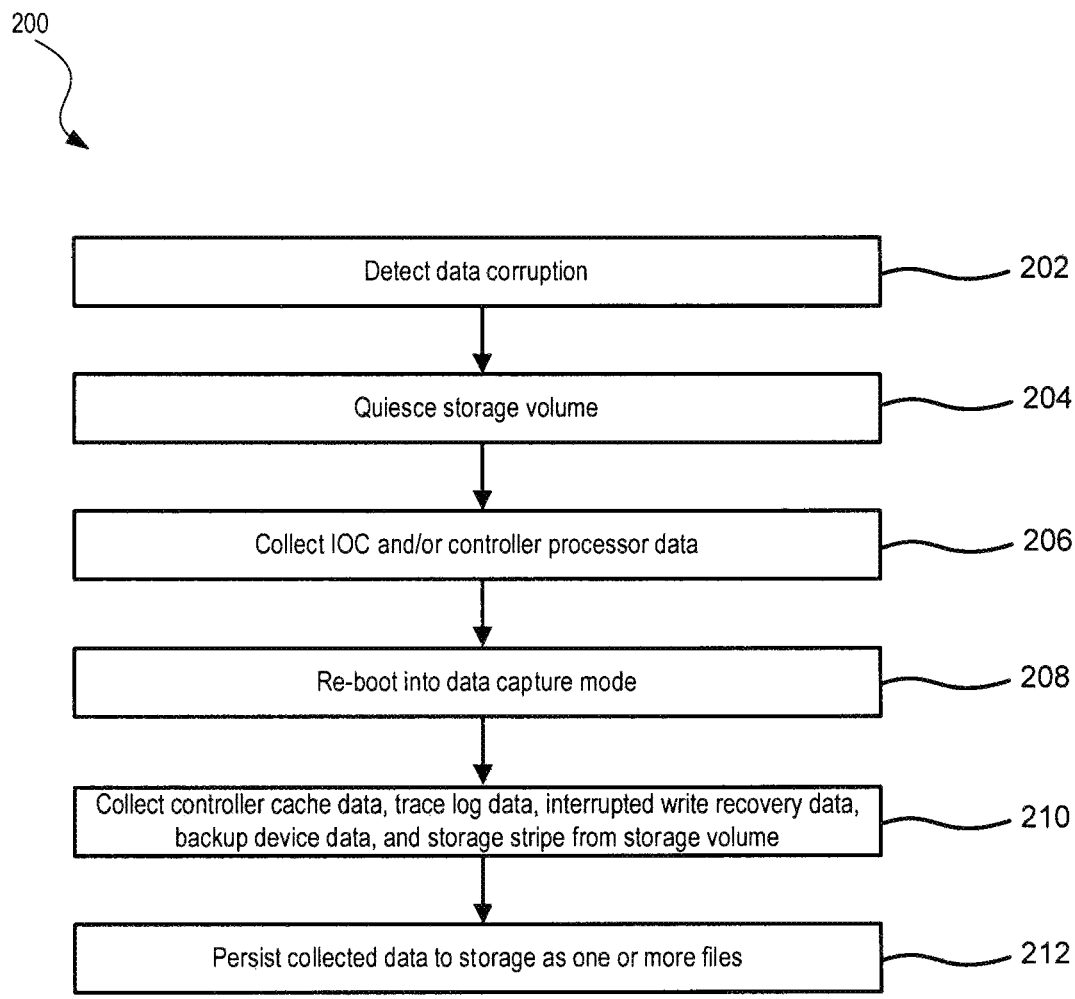
FIG. 2 is a flow diagram illustrating techniques for performing a core dump, according to aspects of the present disclosure.

FIG. 2 is a flow diagram illustrating techniques for performing a core dump, according to aspects of the present disclosure. In an embodiment, the method 200 may be implemented by one or more processors of one or more of the storage controllers of the storage system 104, by executing computer-readable instructions to perform the functions described herein. It is understood that additional steps can be provided before, during, and after the steps of method 200, and that some of the steps described can be replaced or eliminated in other examples of the method 200.

At action 202, a storage controller or a host detects corrupted data stored by the storage controller. The corrupted data may be detected in various ways, such as by comparing data with checksums, cyclic redundancy check (CRC) techniques, and/or parity checking techniques. For example, the storage controller may maintain protection information in the controller cache and/or the storage volumes. This protection information may include information such as guard tags (CRC data), application tags that are received from a host, and/or LBA reference tags. Accordingly, for particular storage blocks, such as data sectors and/or storage stripes, the protection information may be compared between the controller cache and the storage volumes to identify differences regarding the protection information. In another example, a host may detect an I/O error corresponding to corrupted data received from the storage controller and notify the storage controller regarding the corrupted data. The detecting may further include identifying one or more data sectors, one or more storage stripes, and/or one or more volumes corresponding to one or more locations where each error is detected. Data sectors, storage stripes, and/or storage volumes where errors are detected may be referred to as storing corrupted data.

At action 204, the storage controller quiesces one or more storage volumes that are identified as storing the corrupted data. In some examples, the quiescing of the storage volumes includes disabling controller cache flushing, such that data is maintained in the controller cache instead of being flushed to the storage volumes. In some examples, the quiescing of the storage volumes includes placing incoming requests corresponding to the controller cache of the storage controller in a queue data structure, such that the requests are queued instead of being processed to modify the data stored in the controller cache. The protecting of the controller cache from modification may result in controller cache flushing not being triggered, thereby preventing data from being flushed from the controller cache to the storage volumes. In other examples, quiescing may include other operations to pause or inhibit activity corresponding to storage volumes and/the controller cache to protect storage volume data and/or controller cache data from modification.

At action 206, the storage controller collects controller processor and IOC data to include the data in a core dump. In some examples, the storage controller reads the controller processor data from a volatile memory corresponding to the controller processor. One or more controller processor registers in the volatile memory corresponding to the controller processor may be accessed. The controller processor registers are addresses within the volatile memory that are dedicated for controlling the execution of code by the controller processor. In some examples, the storage controller reads the IOC data from a volatile memory corresponding to the IOC. One or more IOC registers in the volatile memory corresponding to the IOC may be accessed. The IOC registers are addresses within the volatile memory that are dedicated for controlling the execution of code by the IOC. In some examples, the controller processor and IOC data is collected and persisted to a storage volume, a region of a controller cache (such as a shared-read only region), and/or a backup device. In some examples, the storage controller determines whether to capture controller processor and/or IOC data based on a type of error that is detected.

In some examples, the data collected from the controller processor and IOC includes all data from the controller processor and IOC. In other examples, the data collected may be a portion of the controller processor data and IOC data. Collected data may be referred to as state data because it reflects the state of the storage system.

At action 208, the storage controller re-boots into data capture mode. In some examples, a re-boot is triggered, with a re-boot reason provided that indicates that a core dump is to be performed following the re-boot. In some examples, data capture mode is referred to as a recovery mode or a lockdown mode because the mode may limit operations that may be performed, relative to normal operation.

In some examples, the data capture mode allows for some host discovery operations to be performed. Read and/or write commands from hosts may be rejected. For example, a "Not Ready Sense Key" message may be provided to a host that attempts to perform I/O. In addition, attempts by users or applications to modify the storage configuration may be rejected while in data capture mode. Accordingly, the data capture mode may provide a more limited operating environment for the duration of the data capture mode, which may be exited following the completion of the core dump process.

In some examples, the re-boot into the data capture mode is performed by the storage controller setting a flag that indicates that data capture mode is to be entered during a boot sequence. The storage controller may then trigger the re-boot operation. During the re-boot, the storage controller may access and parse the flag to identify that the data capture mode is to be entered. The flag may then be cleared after re-booting into the data capture mode, such that upon a next re-boot the storage controller will boot into a normal operation mode rather than the data capture mode. In other examples, the storage controller may exit data capture mode without performing a re-boot.

At action 210, while in data capture mode, the controller cache data, trace log data, interrupted write recovery (IWR) data, backup device data, and storage volume data are collected to include the data in the core dump.

In some examples, the storage controller collects the storage stripe corresponding to the corrupted data from a storage volume. For example, the storage controller may access the data segment(s) and the parity segment(s) of the storage stripe that are identified as including the corrupted data. The storage stripe may then be included in the core dump by storing data segment(s) and parity segment(s) of the storage stripe in a core dump file. In some examples, including the entire storage stripe in a core dump allows for parity analysis to be performed corresponding to a corrupted data sector, such that the corrupted data sector may be recovered. For example, the storage stripe may include one or more parity segments, which may be accessed to determine a correct data value of the data sector that includes the corrupted data. If corrupted data is located in a plurality of data sectors, storage stripes and/or storage volumes, the storage stripes corresponding to each of the locations where the corrupted data is detected may be included in the core dump.

In some examples, if a particular data sector of the storage stripe is determined to be corrupted, the particular data sector of the storage stripe may be collected from the storage volume and included in the core dump. In addition, data sectors that are adjacent to the corrupted data sector, such as the data sectors before and after the particular sector may also be included in the core dump. In other examples, an entire stripe in which a corrupted data sector is detected may be included in the core dump.

The storage controller may be configured with adjustable detail levels, such that the detail level of logging to a trace log may be increased or decreased by the storage controller. For example, during normal operation of the storage controller, the detail level may be reduced to avoid flooding the trace log with a number of log entries that utilize a large amount of storage space and be overwhelming for analysis purposes. The storage controller may increase the detail level of logging during a core dump. While the detail level of logging is increased, the storage controller may re-run read operations corresponding to corrupted, data on the storage devices in, order to gather detailed logs regarding the corrupted data. For example, corrupted data located at particular logical block addresses (LBA) and nearby data extents (such as data located at adjacent LBAs), may be read from the one or more of the storage volumes of the storage devices and written to another storage volume of the storage devices. The I/O trace data corresponding to the read operations may be logged with increased detail in the trace log to assist in later analysis and debugging. For example, additional information corresponding to I/O may be logged, such as I/O identifier information, LBA information, I/O payload information, information identifying the type of error and/or error check performed, and so forth.

During the re-run of the read operations, the storage controller 108 may be structured to operate in a mode that restricts non-core dump related operations. Accordingly, the storage controller may include in the trace log entries that include a high level of detail corresponding to potential causes of the corrupted data without flooding the trace log with log entries that are not relevant to the corrupted data.

All or a portion of the controller cache data may be collected to include the data in the core dump. In some examples, the storage controller reads from the controller cache data corresponding to the region(s) of the storage volume that include the corrupted data. In other examples, all of the controller cache data may be collected.

If corrupted data is located in a plurality of data sectors, the storage stripes corresponding to each of the data sectors where the corrupted data is detected may be included in the core dump. In some examples, protection information such as guard tag (CRC) data, application tag data, and/or LBA reference tag, data that correspond to the corrupted data sectors may be included in the core dump. For example the storage controller may compute CRC values from the data in the controller cache corresponding to the corrupted data sectors. These CRC values may then be compared with CRC values computed from the data at the corresponding locations in a storage volume. These CRCs and/or CRC differences may be included in the core dump instead of or in addition to the corrupted data sectors themselves.

The IWR data may include pending controller cache writes that were interrupted (e.g., during the re-boot in action 208). In some examples, the IWR data is read from a non-volatile storage controller memory. The IWR may be associated with storage stripes of the volumes and/or controller cache by a data structure that may include one or more storage stripe mappings. In some examples, the IWR data is persisted to reserved disk space during operation of the storage controller, such that the IWR data may be collected from the reserved disk space to include the IWR data in the core dump.

Data corresponding to a storage controller's backup device may also be included in the core dump. For example, the backup device may include persistent cache data corresponding to data of the controller cache, controller processor, and/or IOC that was backed up to mitigate loss of data during a power loss. All or a portion of the backup device data may be included in the core dump.

In some examples, the storage controller creates a mapping between the storage volume(s) that include corrupted data and physical storage devices that include the volumes. The mapping may be stored in a mapping file and included in the core dump.

In some examples, the data collected from the controller cache, trace log, IWR portion, backup device, and storage stripe includes all data from the controller cache, trace log, IWR portion, backup device, and storage stripe. In other examples, the data collected may be a portion of the controller cache, trace log, IWR, backup device, and storage stripe data. Collected data may be referred to as state data because it reflects the state of the storage system.

At action 212, the data that is included in the core dump is persisted to storage in one or more files. These files may be referred to as core dump files because they store core dump data (e.g., data collected from the controller processor, IOC, controller cache, trace log, IWR, backup device, and/or storage volume that is collected responsive to a detected error). In some examples, the storage controller creates a data stream corresponding to the core dump data. The core dump data may be streamed to a volume, such as a local volume or a network volume, of one or more storage devices (e.g., storage devices 110, such as HDD and/or SSD storage devices). In some examples, the data is compressed prior to or after being streamed. In other examples, the core dump data may be written to one or more files, and the one or more files may be compressed into a single file or a plurality of files. A stream may include, for example, a copy operation corresponding to the file(s) performed over a network.

In some examples, once the core dump is persisted to storage, an indicator such as a flag may be updated on the storage controller. The indicator may be accessed by another computing device to identify that one or more core dump files are available for retrieval, such that the other computing device may request the one or more core dump files. In other examples, the storage controller may provide the one or more core dump files to the other computing device without first receiving a request from the other computing device.

Figure 3:
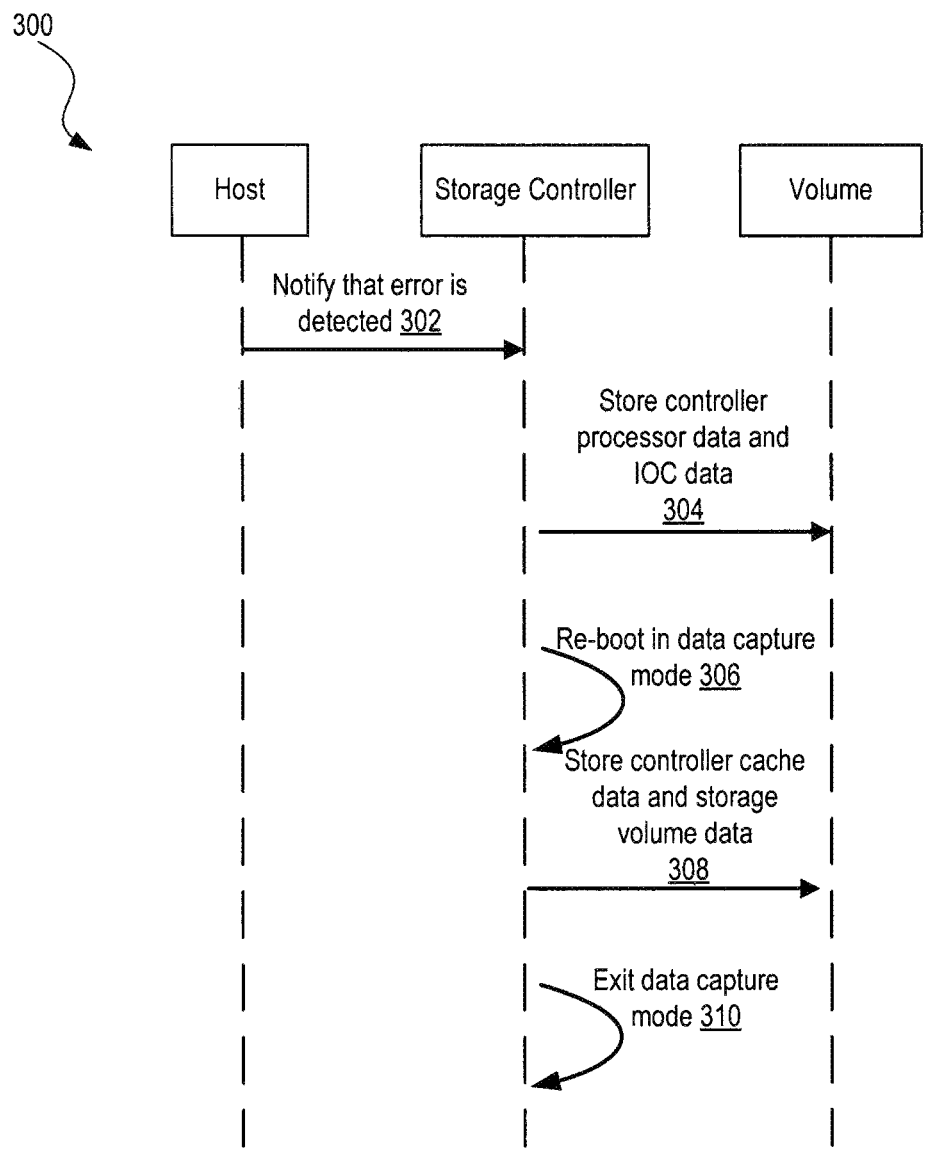
FIG. 3 is a sequence diagram illustrating techniques for performing a core dump, according to aspects of the present disclosure.

FIG. 3 is a sequence diagram illustrating techniques for performing a core dump, according to aspects of the present disclosure.

At action 302, a host notifies a storage controller that an I/O error is detected. The host may include in the notification an identifier of a storage volume corresponding to the I/O. In other examples, as described further with respect to FIG. 2, the storage controller may detect an error, such as a protection information error, without being notified by the host. Based on the notification from the host, the storage controller may identify one or more portions, such as data sectors and/or storage stripes, of the storage volume that include corrupted data that is the cause of the error. As discussed previously with respect to FIG. 2, the error may also be detected by the storage controller rather than by the host. Accordingly, in some examples, the core dump is triggered by the storage controller without the storage controller receiving an error notification from the host.

At action 304, the storage controller persists to memory data from the controller processor and IOC. The controller processor data and IOC data may be persisted to a storage volume as core dump data. In some examples, the core dump data is stored in one or more compressed files in a storage volume of the storage controller that is dedicated to storing core dump files.

At action 306, the storage controller is re-booted in a data capture mode, in which I/O between the host and the storage controller is limited. The storage controller may be re-booted into a data capture mode by, for example, setting a flag in memory and triggering a re-boot.

At action 308, while in data capture mode, the storage controller collects cached data from the controller cache. In some examples, the cached data includes all of the data from the controller cache. In other examples, the storage controller may include in the core dump protection information corresponding to the controller cache data. For example, protection information may include CRC values, LBA reference tags, and application verification information. In addition, trace log entries, IWR data, and/or controller backup device data may also be stored. The collected cached data corresponding to the controller cache may be persisted to the volume of the storage controller that includes the data collected from the processor memory and the storage volume regions.

The storage controller also persists one or more region(s) of the storage volume corresponding to the corrupted data. These storage volume regions may include one or more data sectors, data segments, and/or storage stripes that include the corrupted data.

The collected data of the controller processor, IOC, controller cache, and storage volume may be stored in one or more files, compressed, and/or streamed via a network data stream.

At action 310, the storage controller exits the data capture mode, such as by clearing the flag and re-booting.

Figure 4:
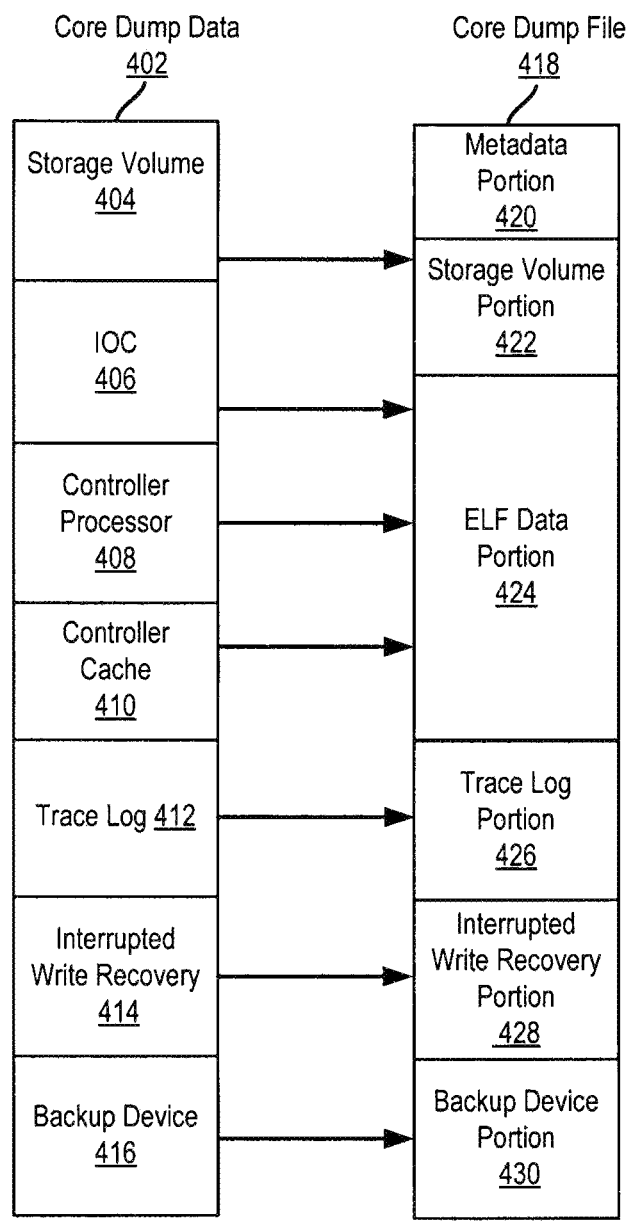
FIG. 4 is an organizational diagram illustrating a core dump data structure, according to aspects of the present disclosure.

FIG. 4 is an organizational diagram illustrating a core dump data structure, according to aspects of the present disclosure.

In the present example, core dump data 402 is collected from the storage controller and persisted to a core dump file 418. In some examples, collecting refers to accessing the core dump data from one or more memory locations. For example, collecting may include reading the data from the one or more locations. In another example, collecting may refer to writing the data from the one or more locations to other locations that are different from the one or more locations. Accordingly, the collecting of the core dump data 402 may include reading, writing, or otherwise accessing of the core dump data 402.

The core dump data 402 includes data corresponding to a storage volume 404, I/O controller (IOC) 406, controller processor 408, controller cache 410, trace log 412, interrupted write recovery 414, and backup device 416. In other examples, additional core dump data may be collected, and core dump data that is included in the illustration may be replaced or eliminated.

The collected core dump data 402 is persisted to at least one core dump file 418. In the present example, the core dump file 418 is shown as a single file, but in other examples the core dump file 418 may include a plurality of files. In some examples, each portion of the core dump file 418 is a separate file that is included in the core dump file 418. For example, a plurality of files may be packaged into a single core dump file 418. In some examples, one or more of the portions may be compressed. For example, the data corresponding to the IOC 406, controller processor 408, controller cache 410, trace log 412, IWR 414, and backup device 416 may be included in the core dump file 418 in a compressed format, while the data corresponding to the storage volume 404 may be included in the core dump file 418 in an uncompressed format.

The core dump file 418 may be stored locally to a storage controller that generates the core dump data 402, or remotely, such as on remote network storage. In some examples, the core dump file 418 is stored in volume that is configured to store core dump data. Data from one or more core dumps may be stored to a same volume or different volumes.

The core dump file 418 includes a metadata portion 420 that defines the structure of the file. For example, the metadata may describe the layout of the file, such that a debugging program may access the portions of the file and retrieve the data from the portions for analysis.

In the present example, the data corresponding to the storage volume 404 is persisted to a storage volume portion 422, data corresponding to the trace log 412 is persisted to a trace log portion 426, data corresponding to IWR 414 is persisted to an interrupted write recovery portion 428, and data corresponding to the backup device 416 is persisted to a backup device portion 430.

In the present example, the data corresponding to the IOC 406 and the controller processor 408 is persisted to an Executable and Linkable Format (ELF) data portion 424 in a 32-bit or a 64-bit format. The ELF data portion 424 is structured as having the ELF standardized file format. However, in other examples, other file formats may be used instead of or in addition to the ELF format. In the present example, data corresponding to the controller cache 410 is persisted to the ELF data portion 424 in a 64-bit format. In some examples, the data corresponding to the IOC 406, controller processor 408, and the controller cache 410 is combined into a single ELF data portion 424 that may include a plurality of portions within the ELF data portion 424.

The present embodiments can take the form of an entirely hardware embodiment, an entirely software embodiment, or an embodiment containing, both hardware and software elements. In that regard, in some embodiments, the computing system is programmable and is programmed to execute processes including the techniques of method 200 discussed herein. Accordingly, it is understood that any operation of the computing system according to the aspects of the present disclosure may be implemented by the computing system using corresponding instructions stored on or in a non-transitory computer readable medium accessible by the processing system. For the purposes of this description, a tangible computer-usable or computer-readable medium can be any apparatus that can store the program for use by or in connection with the instruction execution system, apparatus, or device. The medium may include for example non-volatile memory including magnetic storage, solid-state storage, optical storage, cache memory, and Random Access Memory (RAM).

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
    detecting, by a storage server, that a storage volume includes corrupted data, wherein the storage volume is accessible to a storage controller;

after detecting the corrupted data, quiescing the storage volume;
collecting, from the storage controller, a first portion of data from a controller processor of the storage controller and an input/output controller (IOC) of the storage controller;
after collecting the first portion of data, collecting a second portion of data from a controller cache of the storage controller and the storage volume,
wherein the second portion of data includes data corresponding to the corrupted data;
storing the first portion of data and the second portion of data in one or more files; and
providing data from the one or more files to a second machine for analysis.

2. The method of claim 1, wherein providing data to the second machine includes copying the one or more files to the second machine via a network.

3. The method of claim 1, further comprising:
compressing the one or more files.

4. The method of claim 1, wherein the detecting includes receiving an error message from a host, and
wherein the error message identifies the storage volume and a data sector that stores the corrupted data.

5. The method of claim 1, wherein the detecting includes determining, by the storage controller, that a protection information error threshold is exceeded.

6. The method of claim 1, wherein quiescing the storage volume includes pausing an activity corresponding to the storage volume.

7. The method of claim 1, the method further comprising:
increasing a detail level of a trace log;
re-booting the storage controller;
reading the corrupted data from the storage volume; and
creating a log entry in the trace log corresponding to the reading from the storage volume.

8. The method of claim 1, the method further comprising:
collecting a third portion of data from an interrupted write recovery (IWR) memory of the storage controller, trace log memory of the storage controller, and backup device memory of the storage controller; and
storing the third portion of data in the one or more files.

9. The method of claim 8, wherein the backup device memory includes a shared read-only cache partition of the controller cache.

10. The method of claim 1, the method further comprising:
storing data collected from the controller processor, the IOC, and the storage volume in a file that is formatted according to an Executable and Linkable Format (ELF).

11. The method of claim 1, wherein the corrupted data is stored in a data sector of the storage volume,
wherein the data sector is associated with a storage stripe,
wherein the second portion of data collected from the storage volume includes the corrupted data stored in the data sector and data stored in at, least one immediately adjacent data sector of the storage stripe.

12. A non-transitory machine readable medium having stored thereon instructions for performing a method comprising machine executable code which when executed by at least one machine, causes the machine to:
detect an error corresponding to a data sector of a storage volume;
after the error is detected, quiesce the storage volume;
collect controller processor data and input/output controller (IOC) data from a storage controller that accesses the storage volume;
after the controller processor data and the IOC data is collected, re-boot the storage controller into a limited operating environment mode;
while in the limited operating environment mode, collect controller cache data from the storage controller and storage volume data,
wherein the storage volume data includes data corresponding to the data sector of the storage volume; and
store the controller processor data, IOC data, controller cache data, and storage volume data in one or more files.

13. The non-transitory machine readable medium of claim 12, wherein quiescing the storage volume comprises placing incoming requests corresponding to a controller cache of the storage controller in a queue and/or disabling flushing of the controller cache.

14. The non-transitory machine readable medium of claim 12, wherein the storage volume data that is collected includes data from the data sector and one or more data sectors that are immediately adjacent to the data sector in a storage stripe.

15. The non-transitory machine readable medium of claim 12, the machine further to:
collect interrupted write recovery (IWR) data, trace log data, and backup device data; and
store the IWR data, trace log data, and, backup device data in the one or more files.

16. A computing device comprising:
a memory containing machine readable medium comprising machine executable code having stored thereon instructions for performing a data collection method;
a processor coupled to the memory, the processor configured to execute the machine executable code to cause the processor to:
detect an error corresponding to a data sector of a storage volume;
collect a first data portion from a controller processor and an input/output controller (IOC);
after the first data portion is collected, re-boot the storage controller;
after the storage controller is re-booted, collect a second data portion from a controller cache and the storage volume, wherein the second data portion includes data corresponding to the data sector of the storage volume;
store the first data portion and the second data portion in one or more files; and
communicate the one or more files to a second machine for error analysis.

17. The computing device of claim 16, the processor further to:
quiesce the storage volume by placing incoming requests corresponding to the controller cache in a queue and/or disabling flushing of the controller cache.

18. The computing device of claim 16, wherein the second data portion includes data collected from the data sector and one or more data sectors that are adjacent to the data sector in a storage stripe of the storage volume.

19. The computing device of claim 16, the processor further to:
collect interrupted write recovery (IWR) data, trace log data, and backup device data; and
store the IWR data, trace log data, and backup device data in the one or more files.

20. The computing device of claim 16, wherein the backup device data include data that is read from a shared read-only cache partition of the controller cache.

\* \* \* \* \*